Figure 1:
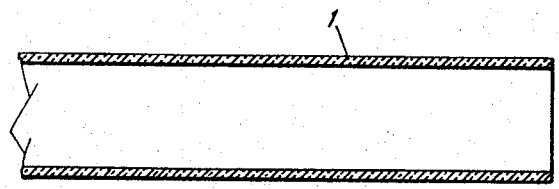

Jan. 9, 1968  O. MEYER  3,362,435
SMOOTH PRECISION FORMED BODY OF VITREOUS MATERIAL AND
METHOD FOR PRODUCING IT
Filed April 6, 1964

Inventor
OTTO MEYER
By Hibben, Noyes & Bicknell
Attorneys

United States Patent Office 3,362,435
Patented Jan. 9, 1968

3,362,435
SMOOTH PRECISION FORMED BODY OF VITREOUS MATERIAL AND METHOD FOR PRODUCING IT
Otto Meyer, Wohlen, near Bern, Switzerland, assignor to Ronor S.A., Bern, Switzerland, a corporation of Switzerland
Filed Apr. 6, 1964, Ser. No. 357,607
Claims priority, application Switzerland, Apr. 5, 1963, 4,402/63
4 Claims. (Cl. 138—178)

This invention relates generally to vitreous materials and to a method of forming vitreous materials. More particularly, the present invention relates to an improved process of forming a cyclically symmetrical hollow body of vitreous material to provide thereon a smooth accurately dimensioned inner surface, and to a smooth accurately dimensioned vitreous body produced by the improved process.

It is known to produce precision formed smooth inner surfaces in cyclically symmetrical hollow bodies of vitreous material by a process in which the hollow body, which is slightly larger than its final dimensions, is fitted by suction on to a mandril by carrying a heating zone axially through the hollow body in the direction of suction. By this method there are obtained, for example, tapered tubes with accurate internal dimensions for use in flow meters (see e.g. British patent specification No. 573,235). This method, however, produces considerable stresses in the workpiece so that a high proportion of rejects results due to breakage. The workpiece, provided it does not break, must then be relieved from stress by tempering. These and other disadvantages of the process have hitherto prevented its use for other purposes, for example for forming connecting surfaces in glass instruments such as flasks, fractionating columns, coolers, stoppers, taps and stop cocks etc. such as are used for assembling chemical apparatus. Such standardised, usually conical or spherical connection surfaces are formed almost exclusively by grinding although this method is relatively expensive and has the disadvantages associated with roughening of the glass surface (including being more easily soiled and more easily attacked by chemicals which destroy glass), and due to vibration and imbalance resulting from uneven wall thickness, the shape finally obtained is that of a polygon only approximating cyclical symmetry.

It has now been found that the disadvantages of the hot forming process mentioned above can be avoided if the mandril is preheated to a temperature preferably slightly below the lower annealing point of the vitreous material before the hollow body is fitted on it by suction. The lower annealing point or strain point is the temperature at which the vitreous material has a dynamic viscosity of $10^{14.5}$ poises. The minimum temperature of the mandril should not be lower by more than about 150° C. than this strain point because otherwise the aforementioned disadvantages occur. The upper temperature limit of the threshold mandril is determined by the fact that if the temperature of the mandril is too high, the hollow body of vitreous material will stick to the forming surface of the mandril, whcih would impair the formation of a smooth, accurate surface. In determining the latter temperature limit, it must be taken into account that when the softened glass is fitted to the mandril, heat transfer takes place from the glass to the moulding tool, so that the temperature of the tool rises by about 100 to 200° C. depending on the shape and size of the glass body and of the tool. The temperature of the preheated mandril must not therefore be much higher than the strain point of the vitreous material.

The invention thus relates to a method of producing a smooth, precision formed inner surface in a cyclically symmetrical hollow body of vitreous material, in which a hollow body having dimensions slightly larger than the desired final dimensions is fitted by suction on a mandril by carrying a heating zone axially through the hollow body in the direction of suction, the mandril being preheated to a temperature not much higher and not more than about 150° C. lower than the strain point of the vitreous material.

An example of the invention will now be described by way of illustration only with reference to the accompanying drawing in which FIGS. 1 to 4 show four separate stages in the application of the process of the invention for producing a smooth, conical inner surface in the end section of a glass tube.

The temperatures given in the example refer to work done on a normal apparatus glass of the boro-silicate type, such as Pyrex (Trademark) produced by Corning Glass Works or Duran (Trademark) with tools (i.e. mandrils) made of Inconel (Trademark), a high nickel-chromium iron alloy produced by International Nickel Co. These figures must, of course, be suitably varied for vitreous materials having different temperature/viscosity relationships.

Example

A glass tube 1, only the right hand end of which is shown in longitudinal section in the drawing, is clamped in a rotatable lathe at the left hand end and is rotated at constant speed about its longitudinal axis. It is then softened at a position 1a (FIG. 2) with an acetylene flame 2' the temperature of which is adjusted to the type of glass used, so that the whole of an end section 1b can be formed approximately, to the final shape, e.g. of a ball socket. For this purpose, a moulding tool 4 mounted rotatably about its longitudinal axis 4a is pressed onto the end section 1b and at the same time the flame is moved continuously from the position 2' to the position 2, so that the end section of the tube is given roughly its correct form. If the end of the tube is to be beaded, it is advantageous to use two further moulding tools 5 and 6 which are also rotatable about their longitudinal axes 5a and 6a respectively and which are both driven by the rotating glass tube, the first mentioned of these tools supporting the deformable glass wall on the inside and the second tool forming the beading 1c with the aid of the flame 2.

When this preliminary work on the end of the tube is finished, the tools 5 and 6 are removed and a mandril 7 which is preheated to about 450° C. and which is either freely rotatable or rotated at the same speed as the glass tube 1 is inserted in the end aperture of the end section 1b. The other end of the glass tube is now connected to a vacuum pump which is switched on to evacuate the tube. The flame 2 causes the outermost end of the tube, which is heated to a strong red glow (about 800 to 900° C.) to soften so that it comes into close contact with the mandril 7 which should have a very smooth surface. The flame is then moved slowly and continuously from position 2 to position 2' while the tube 1 together with the mandril 7 continues to rotate about its longitudinal axis so that the heating zone moves from the right hand end of the tube to the other end of the end section. The end section is thus closely fitted to the mandril 7 due to the vacuum inside the tube. The temperature of the mandril 7 rises by about 100 to 150° C. due to contact of the mandril with the heated glass and at the same time the end of the tube cools down and solidifies as the flame moves to the left. When the flame has reached the position 2' it is turned off. When the temperatures of the workpiece and the mandril have been equalised, everything cools; the cooling may, if desired, be accelerated by suitable means. Since the mandril 7 has a higher coefficient of thermal expansion below the transformation temperature than the glass tube 1, it undergoes more contraction on cooling so that it becomes detached from the tube and can easily be removed.

Figure 2:
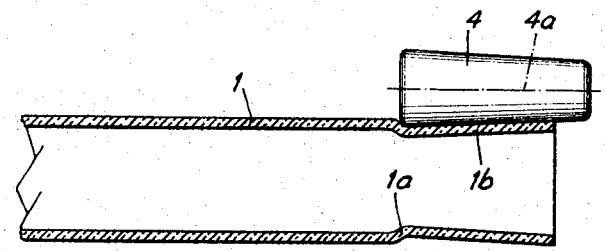
Figure 3:
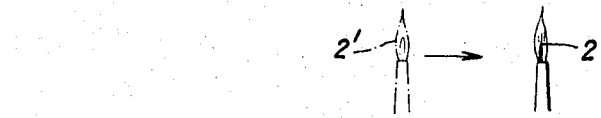
Figure 4:
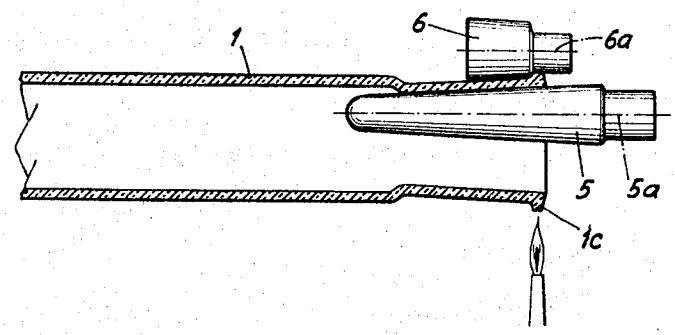

The preliminary working up, that is the working corresponding to that shown in FIGURES 2 and 3 may be partly or completely omitted. Heating need not necessarily be effected with a flame but could equally well be effected by means of electrical resistance heating, inductive heating, etc., if the whole process is suitably adapted. Precision formed, smooth inner surfaces can be obtained not only in conical sockets but also in other cyclically symmetrical hollow bodies, for example hollow cylinders, ball sockets and the like, by the method described.

I claim:

1. A method of making a smooth, precision-formed inner surface connective or closure end section on a hollow body of vitreous material comprising: inserting a metal mandril having a precision-formed accurately dimensioned tapered outer surface into one end of a cyclically symmetrical hollow vitreous body having interior dimensions slightly larger than said outer surface with an end of said outer surface extending axially beyond said one end of said hollow body, said mandril when inserted into said one end being preheated to a temperature which is not substantially higher than the strain point and not more than about 150° C. lower than the strain point of said vitreous material, applying a suction to the interior of said hollow body at a point spaced from said one end of said body while applying heat to said one end of said body to soften said one end and draw said one end of said body into sealing engagement with said outer surfaces of said mandril, and fitting said end section of said hollow body to said outer surface of said mandril by continuously applying said suction and moving a heating zone axially the length of said end section in the direction of said suction.

2. A method as in claim 1, wherein said mandril is preheated to a temperature of about 60° C. below the strain point of said vitreous material and is heated to a maximum temperature of about 150° C. above the preheated temperature thereof while fitting said end section thereto.

3. In a hot forming method of producing a smooth, precision formed connector or closure type inner surface end section on cyclically symmetrical hollow body of vitreous material, the improvement comprising: positioning a tapered metal mandril having an outer surface with accurate dimensions in one end of said hollow body with said mandril extending into the interior of said hollow body, forming a sealable engagement between the inner surface of said one end and said outer surface of said mandril, sealably fitting by suction said end section of said hollow body slightly larger than said accurate dimensions of said mandril by carrying a heating zone axially from said one end of said hollow body through said hollow body the length of said end section in the direction of said suction, and said mandril being heated prior to insertion into said hollow body to a temperature which is not substantially higher than the strain point and no more than 150° C. lower than said strain point of the vitreous material when said mandril is positioned in said hollow body.

4. A vitreous cyclically symmetrical hollow body having an accurately dimensioned precision-formed inner surface when produced by the process of claim 3.

References Cited

UNITED STATES PATENTS 2,754,626  7/1956  Porter _____ 65—277

FOREIGN PATENTS 573,235  11/1945  Great Britain.

DONALL H. SYLVESTER, *Primary Examiner.*

G. R. MYERS, R. L. LINDSAY, *Assistant Examiners.*